United States Patent [19]

Quartara

[11] 4,183,542
[45] Jan. 15, 1980

[54] ROTATING FACE SEALING GASKET, PARTICULARLY FOR USE ON TRACKED VEHICLES

[75] Inventor: Patrizia Quartara, Turin, Italy

[73] Assignee: Fonderia R. Bertoldo & C. S.a.s., Turin, Italy

[21] Appl. No.: 947,339

[22] Filed: Sep. 26, 1978

[30] Foreign Application Priority Data

Oct. 21, 1977 [IT] Italy ............................. 53586 A/77

[51] Int. Cl.² ............................................. F16J 15/38
[52] U.S. Cl. ....................................... 277/92; 277/95; 305/11
[58] Field of Search ................. 277/81 R, 85, 88, 92, 277/94, 95; 305/11–13

[56] References Cited

U.S. PATENT DOCUMENTS

| 3,241,843 | 3/1966 | Hatch et al. | 277/92 |
| 3,662,847 | 5/1972 | Skanes et al. | 305/11 X |
| 4,094,516 | 6/1978 | Morley et al. | 305/11 X |
| 4,111,436 | 9/1978 | Yazawa | 277/92 |

Primary Examiner—Robert S. Ward, Jr.
Attorney, Agent, or Firm—Young & Thompson

[57] ABSTRACT

A rotating face sealing gasket, particularly for use on tracked vehicles, constituted by a pair of facing metal rings in mutual sliding contact, and a pair of rings of resilient material mounted on the outside of each metal ring and forming a seal one against a rotating surface and the other against a fixed surface of the vehicle. A mutual slide-proof connection between each metal ring and the resilient ring rigid therewith is obtained by providing a plurality of ribs on the one to cooperate with an equal number of grooves in the other.

5 Claims, 6 Drawing Figures

ROTATING FACE SEALING GASKET, PARTICULARLY FOR USE ON TRACKED VEHICLES

This invention relates to a rotating face sealing gasket, particularly for use on tracked vehicles.

Face sealing gaskets are generally constituted by two metal rings of suitable cross-section mounted in such a manner that two facing surfaces are in contact, one of which slides against the other.

The rotation of one of the rings and the sealing function of the gasket are determined by two rings of resilient material mounted on each metal ring.

One of the most common and severe applications of said gaskets is in providing a seal between the chassis of a tracked vehicle, for example an agricultural or industrial tractor, and the relative rollers which support the tracks.

As said vehicles are intended for use on ground of all types (sandy, gravelly, mixed clay and humus), it is understandably indispensable to provide perfect seals between the rotating and fixed members of the vehicle in order to prevent any damaging infiltration of particles which would irreparably damage the vehicle.

This problem is made more difficult to solve in that the ground over which the tracks run is completely uniform, so that the gaskets have to support considerable axial and radial stresses.

Thus it often happens that the resilient ring of the rotating gasket portion slides about the metal ring which supports it instead of remaining firmly connected to it, as it should. The resilient ring therefore becomes burnt after a short time because of the high angular speed to which it is subjected, and thus makes the gasket unserviceable because it can no longer form a seal.

The object of the present invention is to provide a gasket for tracked vehicles in which the resilient seal ring remains firmly connected to its supporting metal ring for any rotational speed of the roller, such that the necessary sliding takes place always and only between the contacting surfaces of the metal rings.

For these and further objects, which will be more apparent hereinafter, the present invention provides a rotating face sealing gasket, particularly for use on tracked vehicles, constituted by a pair of facing metal rings in mutual sliding contact, and a pair of rings of resilient material mounted on the outside of each metal ring and forming a seal one against a rotating surface and the other against a fixed surface of the vehicle, wherein the mutual slide-proof connection between each metal ring and the resilient ring rigid therewith is obtained by providing a plurality of ribs on the one to cooperate with an equal number of grooves in the other.

A preferred embodiment of the device according to the invention is described hereinafter by way of non-limiting example with reference to the accompanying drawings, in which.

Figure 1:
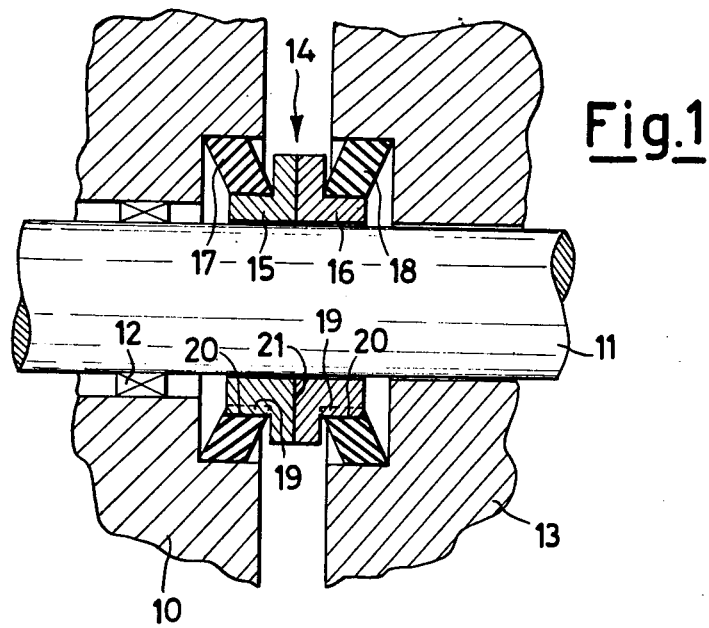
FIG. 1 is an axial section through an example of assembly of the gasket according to the invention.

FIG. 1 shows a diagrammatic application of the joint according to the invention. A roller 10 is mounted rotatably on a shaft 11 by way of a bearing 12.

The roller 10 supports the track (not shown here for simplicity) in known manner. The shaft 11 is rigid with the vehicle chassis 13, by which it is supported.

The gasket 14 according to the invention is inserted between the roller 10 and chassis 13 in the manner hereinafter described.

This gasket is composed substantially of two metal rings 15 and 16 mounted with slight slack on the shaft 11, and two rings of resilient material 17 and 18 such as rubber, which are rigid by way of their inner surfaces with each metal ring 15 and 16.

Figure 2:
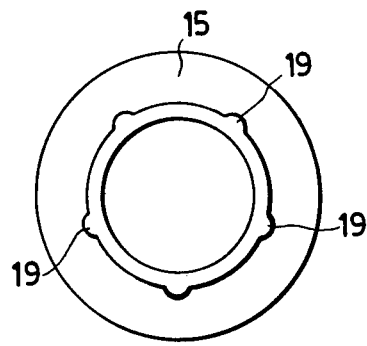
FIGS. 2 and 3 are front views of two details of FIG. 1 constituting the gasket according to the invention.
Figure 3:
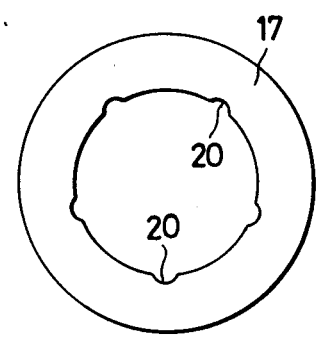

As shown in FIGS. 1 and 2, the metal rings 15 and 16 each have a L diametrical cross-section and comprise a plurality of radial ribs 19 provided at preferred distances apart along the horizontal circular surface which supports each resilient ring 17 and 18.

Each ring 17 and 18 is provided with radial grooves 20 designed to cooperate with the ribs 19 during the assembly and operation of the gasket 14.

Figure 4:
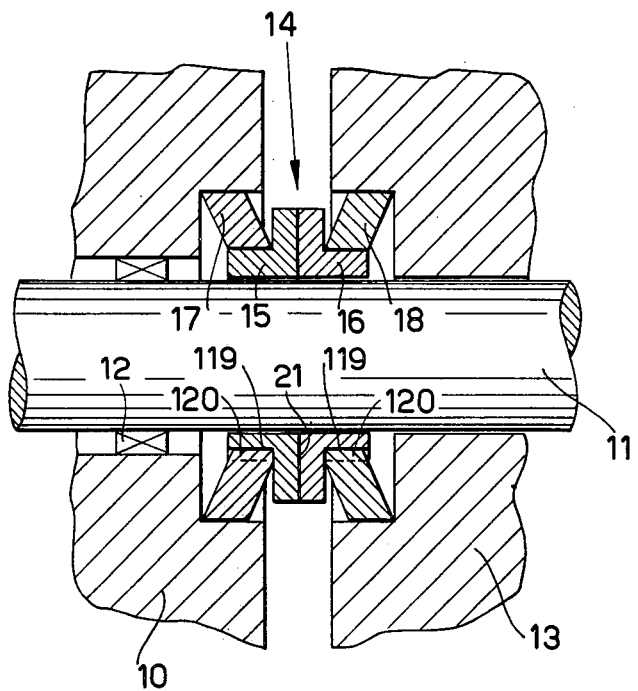
FIG. 4 is an axial section through an example of assembly of a further embodiment of the gasket according to the invention.
Figure 5:
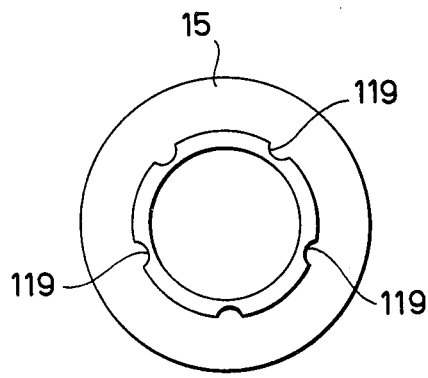
FIGS. 5 and 6 are front views of two details of FIG. 4.
Figure 6:
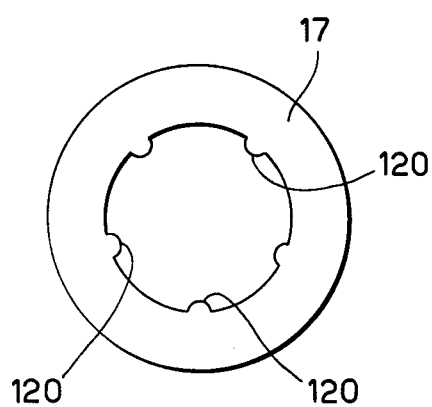

FIGS. 4, 5 and 6 show a second embodiment of the joint according to the invention. Reference numerals indicating corresponding elements described in the case of the first embodiment are unchanged.

These figures show that the same seal between the rings 15, 17 and 16, 18 can be obtained by providing grooves 119 in the two metal rings 15 and 16, and ribs 120 on the two resilient rings 17 and 18.

Thus it is apparent that this second embodiment differs from the first only in the method of construction, whereas the seal characteristics between the metal and rubber rings remain unchanged.

The operation of the two embodiments of the device is as follows.

The rotation of the roller 10 causes the rubber ring 17 and metal ring 15 to rotate. This latter slides by way of its surface 21 against the facing surface of the adjacent ring 16. Advantageously, the surfaces 21 are lapped to prevent any seizing or overheating due to friction between the two rings 15 and 16. The two rings 17 and 18 are compressed between the roller or chassis and the rings 15 and 16 respectively during assembly, to provide a perfect oil seal even in the case of any misalignment between the various members.

In this respect, with the device according to the invention there is no longer any harmful sliding of the resilient ring 17 on the metal ring 15, as these are made mutually rigid during rotation by the presence of the grooves 20, 120 and ribs 19, 119 respectively.

The special rhomboidal cross-section of each resilient ring 17 and 18 gives it a greater elasticity and a greater capacity to react against impact, so that it tends to automatically centre itself under any operational condition of the roller 10.

It is therefore apparent that the device according to the invention provides a permanent perfect oil seal, and any danger of burning of the outer resilient rings is obviated, whereas sliding between rotating and fixed parts takes place exclusively between the facing surfaces of the two metal rings under any spacial position and any speed of rotation.

Modifications in form or structure can be made to the described embodiment of the invention, such as the number, shape and size of the ribs and grooves, without leaving the scope of the invention as described by the following claims.

What I claim is:

1. A rotating face sealing gasket, particularly for use on tracked vehicles, constituted by a pair of facing metal rings in mutual sliding contact, and a pair of rings of resilient material mounted on the outside of each metal ring and forming a seal one against a rotating surface and the other against a fixed surface of the vehicle, wherein the mutual slide-proof connection between each metal ring and the resilient ring rigid therewith is obtained by providing a plurality of ribs on the one to cooperate with an equal number of grooves in the other.

2. A gasket as claimed in claim 1, wherein the ribs are provided on the metal rings and the grooves are provided in the resilient rings.

3. A gasket as claimed in claim 1, wherein the ribs are provided on the resilient rings and the grooves are provided in the metal rings.

4. A gasket as claimed in claim 1 or 2, wherein each metal ring has a L diametrical cross-section, and the ribs are provided circumferentially on the flat surface opposite the surface of contact between the two rings.

5. A gasket as claimed in claim 1, wherein the resilient rings each have a rhomboidal diametrical cross-section.